(12) United States Patent
Hemani et al.

(10) Patent No.: US 11,301,506 B2
(45) Date of Patent: Apr. 12, 2022

(54) AUTOMATED DIGITAL ASSET TAGGING USING MULTIPLE VOCABULARY SETS

(71) Applicant: Adobe Inc., San Jose, CA (US)

(72) Inventors: Mayur Hemani, Delhi (IN); Balaji Krishnamurthy, Noida (IN)

(73) Assignee: Adobe Inc., San Jose, CA (US)

(*) Notice: Subject to any disclaimer, the term of this patent is extended or adjusted under 35 U.S.C. 154(b) by 832 days.

(21) Appl. No.: 15/637,829

(22) Filed: Jun. 29, 2017

(65) Prior Publication Data
US 2019/0005043 A1 Jan. 3, 2019

(51) Int. Cl.
G06F 16/00 (2019.01)
G06F 16/48 (2019.01)
G06F 3/0482 (2013.01)
G06F 16/36 (2019.01)
G06F 16/332 (2019.01)
G06F 16/33 (2019.01)
G06F 16/55 (2019.01)
G06F 16/56 (2019.01)

(52) U.S. Cl.
CPC ............ G06F 16/48 (2019.01); G06F 3/0482 (2013.01); G06F 16/3322 (2019.01); G06F 16/3334 (2019.01); G06F 16/3338 (2019.01); G06F 16/374 (2019.01); G06F 16/55 (2019.01); G06F 16/56 (2019.01)

(58) Field of Classification Search
CPC ............ G06F 16/3322; G06F 16/3334; G06F 16/3338; G06F 16/374; G06F 16/48; G06F 16/55; G06F 16/56; G06F 3/0482

USPC .......................................................... 707/694
See application file for complete search history.

(56) References Cited

U.S. PATENT DOCUMENTS

| | | | |
|---|---|---|---|
| 7,805,299 B2* | 9/2010 | Coifman | G10L 15/065 704/235 |
| 2003/0069908 A1* | 4/2003 | Anthony | G06F 40/143 715/251 |
| 2012/0123976 A1* | 5/2012 | Wang | G06F 16/5838 706/12 |
| 2014/0029839 A1* | 1/2014 | Mensink | G06K 9/6272 382/159 |
| 2015/0036919 A1* | 2/2015 | Bourdev | G06K 9/6256 382/156 |
| 2016/0117574 A1* | 4/2016 | Mei | G06F 16/5838 382/159 |
| 2016/0379091 A1* | 12/2016 | Lin | G06K 9/6256 382/156 |
| 2017/0004383 A1* | 1/2017 | Lin | G06K 9/6215 |

\* cited by examiner

Primary Examiner — Vincent F Boccio
(74) Attorney, Agent, or Firm — FIG. 1 Patents

(57) ABSTRACT

Automated digital asset tagging techniques and systems are described that support use of multiple vocabulary sets. In one example, a plurality of digital assets are obtained having first-vocabulary tags taken from a first-vocabulary set. Second-vocabulary tags taken from a second-vocabulary set are assigned to the plurality of digital assets through machine learning. A determination is made that at least one first-vocabulary tag includes a plurality of visual classes based on the assignment of at least one second-vocabulary tag. Digital assets are collected from the plurality of digital assets that correspond to one visual class of the plurality of visual classes. The model is generated using machine learning based on the collected digital assets.

20 Claims, 8 Drawing Sheets

AUTOMATED DIGITAL ASSET TAGGING USING MULTIPLE VOCABULARY SETS

BACKGROUND

The tagging of digital assets (e.g., digital images, videos, digital audio) is typically performed to support a keyword search by computing devices for the digital assets. A user input, for instance, may provide a search query having the keyword "beach" to a computing device, e.g., locally and/or remotely as part of a search engine. A keyword search is then performed by the computing device to locate digital assets that have tags (e.g., a digital image of a beach) that correspond to keywords as part of the search query. Thus, accuracy of the tagging is a primary factor in location of desired digital assets.

Digital asset management systems that support these types of searches may contain millions of digital assets. Accordingly, techniques have been developed to automatically tag the digital assets. To do so, conventional service provider systems tag the images using a vocabulary set, e.g., a taxonomy of words used to classify characteristics of the assets. However, in practice this vocabulary set may different from a vocabulary set used by other digital asset management systems to tag the same or similar digital assets. For example, a conventional service provider system may be used to tag digital assets using a generic vocabulary set. On the other hand, a digital asset management system employed by a third party (e.g., a car manufacturer) may employ a custom vocabulary set, e.g., to describe an exterior, interior, and/or logo of the same car.

Accordingly, conventional service provider systems are confronted with the challenge of propagating generic tags used by the generic vocabulary set to custom tags used by the custom vocabulary set. Prior techniques to do so, however, are typically prone to error and thus reduce accuracy in the tagging and consequently accuracy in searches performed based on these tags. Conventional techniques and systems, for instance, may involve re-training of base neural network models used to tag the digital assets (e.g., which is inefficient and computationally expensive) "from scratch" or use of a similarity metric between the assets to propagate tags. The former approach, in addition to being computationally expensive also requires a significant number of already tagged digital assets for training which in practice is not commonly available. The later approach is considered a brute-force technique that is not computationally feasible for a significant number of digital assets as has become increasingly commonplace by digital asset management systems.

SUMMARY

Automated digital asset tagging techniques and systems are described that support use of multiple vocabulary sets. In one example, a service provider system that is configured to perform automated tag assignment according to one vocabulary set is configured to address another vocabulary set. The service provider system, for instance, may be configured to support automated tagging of digital assets (e.g., digital images) through use of models trained using machine learning in accordance with a generic vocabulary set. The service provider system may then leverage these trained models to perform tagging in accordance with a custom vocabulary set used by a third-party digital asset management system. To do so in one example, the service provider system extracts the last layer activations of the models trained according to the generic vocabulary set. Other examples are also contemplated including use of lower layer activations and activations from other layers from neural network models. The service provider system then uses these activations as features along with training data including digital assets that have been tagged according to the custom vocabulary set to train models in accordance with the custom vocabulary set.

As part of this, techniques may be employed to identify and differentiate between different visual classes that may be classified as corresponding to a single custom tag. The digital asset management system, for instance, may use a custom tag of a particular brand of car to tag the exterior, interior, and logo of the car. Accordingly, continuing with the previous example comparison of generic and custom tags to digital assets may be used to identify existence of these different visual classes, and train individual sub-models, e.g., one for each visual class. The criterion used by the service provider system to determine when the split the model into sub-models is based on correspondence of a tag from the first "custom" vocabulary set with multiple tags of the second "generic" vocabulary set. As a result, accuracy and efficiency of each of the sub-models is increased. Further discussion of these and other examples is included in the following sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
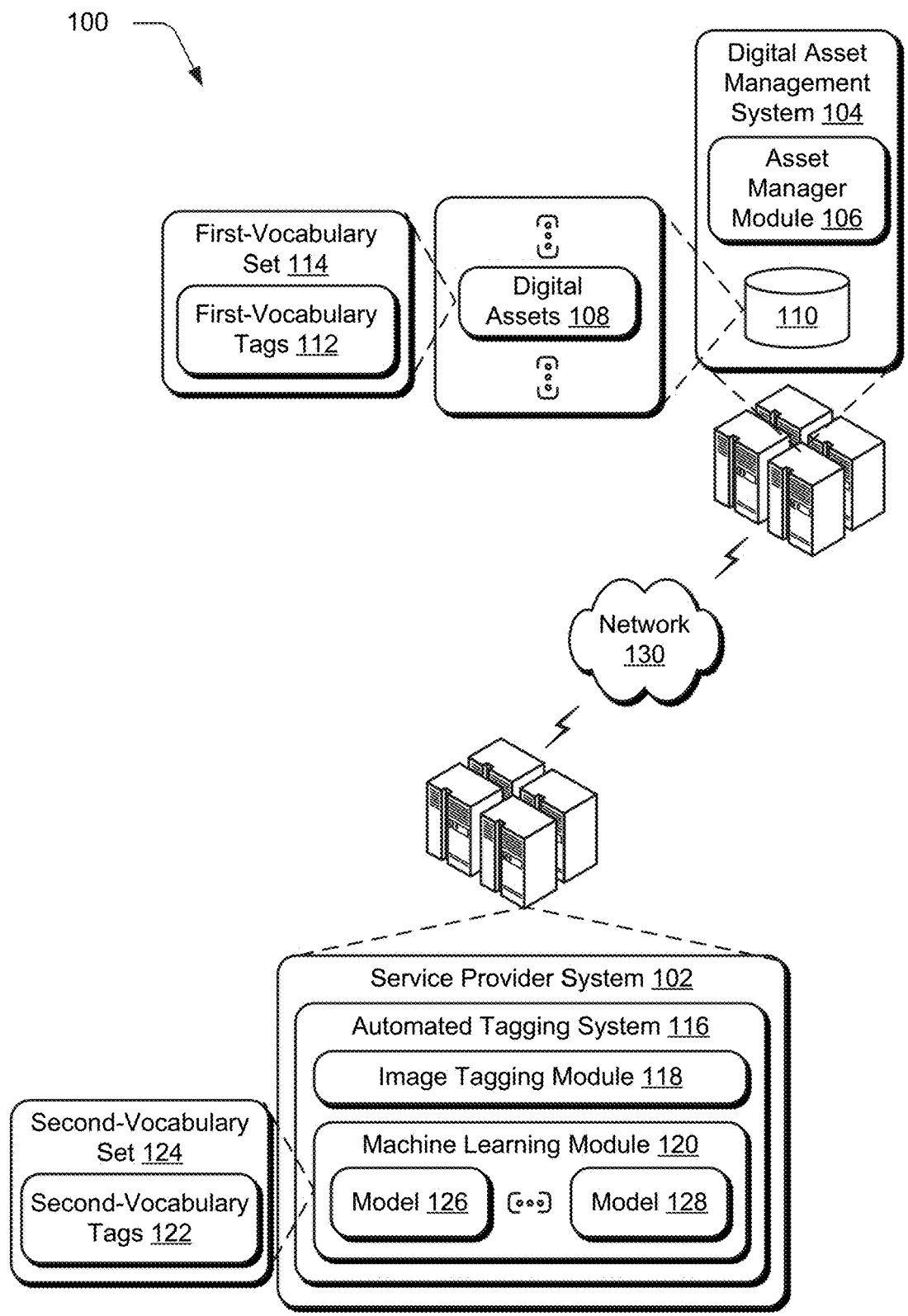
FIG. 1 is an illustration of an environment in an example implementation that is operable to employ automated digital asset tagging techniques described herein.

Automated digital asset tagging techniques and systems are described that are configured to support multiple vocabulary sets. In one example, a service provider system is configured to generate custom tags for a custom vocabulary set used by a third-party digital asset management system by leveraging a generic vocabulary set. As a result, computational resources may be conserved by leveraging the models used to provide the generic tagging, e.g., without retraining the models "from scratch." Further, these techniques are usable in scenarios in which generation of the model is constrained by a limited number of examples of training digital assets (e.g., tagged images), which could cause conventional techniques to fail and thus supports increased accuracy.

A digital asset management system employed by a third party, for instance, may be configured to search and manage storage of digital assets according to a first-vocabulary set, e.g., for digital images maintained by an auto manufacturer. The first-vocabulary set may employ a taxonomy to classify the digital assets based on respective characteristics, such as objects included in the digital asset, types of objects (e.g., particular brands of car), semantic classes (e.g., "happy"), and so forth. On the other hand, a service provider system may be configured to automatically tag digital images accordingly to a second-vocabulary set that employs a taxonomy that is different than the taxonomy of the first-vocabulary set, e.g., a generic taxonomy that is not specific to the auto manufacturer. Accordingly, techniques are described in which generic tags from the second "generic" vocabulary set are used as part of generating custom tags according to the first "custom" vocabulary set. As a result, computational resources may be conserved while providing support for digital asset tagging across a diverse group of digital asset management systems and use of reduced set of training digital assets that would cause conventional techniques to fail.

In one example, generic models are first trained in accordance with a second-vocabulary set, e.g., a generic vocabulary, using neural networks or toher machine learning techniques. Activations of nodes of the last layer of the neural network of these generic vocabulary models are then extracted for each of training images as features. These extracted features are then used as a basis to train custom models (e.g., SVM classification models) using training digital assets in compliance with a first-vocabulary set, e.g., a custom vocabulary. Each of the customs models, for instance, may be trained for a respective one of several different tags included as part of the first-vocabulary set. Thus, each of the models is configured to output a probability (i.e., confidence level) that a particular digital asset corresponds to a respective custom tag of the model. As a result, the custom models may be trained with increased efficiency and with fewer examples of digital assets that are trained using the first-vocabulary set without "retaining" these custom models from the beginning as required by conventional techniques.

One of the challenges in supporting different vocabulary sets is that digital assets that have noticeable differences may be tagged using the same tag. In an example in which the digital assets are digital images, for instance, a first-vocabulary set of a car manufacturer may result in the same tag of a particular brand of car being applied to digital images of an exterior, interior, and logo of the car. To address these visual differences and ensure tagging accuracy, the techniques described herein may split a model for a single tag from a first "custom" vocabulary set into multiple sub-models, each corresponding to a respective one of several different visual classes that correspond to the single tag.

Continuing the previous example, this may include sub-models of the exterior, interior, and logo of the particular brand of car. Each of these sub-models is trained using machine learning in accordance with a respective visual class, e.g., using digital assets that correspond to this class. The criterion used by the service provider system to determine when the split the model into sub-models is based on correspondence of a tag from the first "custom" vocabulary set with multiple tags of the second "generic" vocabulary set. Thus, each of these sub-models may be trained to accurately identify digital objects as including a corresponding characteristic of the single tag.

Another challenge in supporting different vocabularies is to obtain a sufficient number of training digital asset examples that have been tagged for each tag using the first-vocabulary set, i.e., the custom vocabulary. Accordingly, techniques are described in the following in which the model is trained using positive and negative tag examples. This may be used to further increase accuracy in assigning a respective single tag to a digital asset and may be trained using a reduced number of examples, further discussion of which is described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102 and a digital asset management system 104 that are communicatively coupled, one to another, via a network 130. Computing devices that implement the service provider system 102 and the digital asset management system 104 may be configured in a variety of ways.

A computing device, for instance, may range from full resource devices with substantial memory and processor resources (e.g., personal computers, game consoles) to a low-resource device with limited memory and/or processing resources (e.g., mobile devices). Additionally, a computing device may be representative of several different different devices, such as multiple servers utilized by a business to perform operations "over the cloud" as illustrated for the service provider system 102 and the digital asset management system 104 and as described in FIG. 8.

The digital asset management system 104 is illustrated as including an asset manager module 106. The asset manager module 106 is representative of functionality implemented by at least one computing device (e.g., a processing system and computer-readable storage media of FIG. 8) to manage storage and search of digital assets 108, which is illustrated as stored in a storage system 110 by the digital asset management system 104. The digital assets 108 may take a variety of forms that are storable in memory of a computing device, including a digital image, digital audio, digital video, multimedia digital content, and so forth. Thus, although the following examples describe digital assets 108 as digital images, these techniques are equally applicable to these other forms.

The asset manager module 106 is configured to manage the digital assets 108 using first-vocabulary tags 112 assigned is accordance with a first-vocabulary set 114. The first-vocabulary set 114, for instance, may define a taxonomy of first-vocabulary tags 112 used to classify characteristics of the digital assets 108. The characteristics, for instance, may include objects (e.g., car), types of objects (e.g., particular brand of car), semantic classes (e.g., happy, sad), visual characteristics (e.g., composition, lighting, color palettes, contrast, saturation), audio characteristics (e.g., intensity), and so forth. Thus, the first-vocabulary set 114 and associated first-vocabulary tags 112 may be used by the asset manager module 106 to manage how to locate digital assets 108 (e.g., as part of a keyword search), manage storage of the digital assets 108, and so forth.

The digital medium environment 100 is also illustrated as including an automated tagging system 116 implemented by the service provider system 102 via the network 130. Although illustrated as remote to the digital asset management system 104, all or part of this functionality may also be implemented locally by the digital asset management system 104 itself The automated tagging system 116 includes an image tagging module 118 and machine learning module 120 that are implemented at least partially in hardware of at least one computing device to assign second-vocabulary tags 122 to digital assets in accordance with a second-vocabulary set 124.

The automated tagging system 116, for instance, through use of the machine learning module 120 may train several different models 126, 128 according to the second-vocabulary set 124. These models 126, 128, once trained, are thus configured to tag digital assets using respective tags, e.g., based on a probability that a digital asset corresponds to a characteristic (e.g., positive or negative) associated with a respective tag through machine learning. The automated tagging system 116, for instance, may be provided as a service to provide automated tagging of digital assets 108 according to the second-vocabulary set 124.

As previously described, however, the digital asset management system 104 may manage digital assets 108 according to a first-vocabulary set 114 that is different than the second-vocabulary set 124. The first-vocabulary set 114, for instance, may include custom first-vocabulary tags 112 such as names of products and services that are not included in the second-vocabulary set 124 and vice versa. Accordingly, the automated tagging system 116 is configured to also employ the first-vocabulary set 114 to tag digital assets 108 by leveraging the second-vocabulary set 124. As a result, the tagging may be performed with increased computational efficiency through use of a reduced training set of digital assets 108 that have been tagged 122 in accordance with the first-vocabulary set 114 in comparison with conventional techniques that "start from scratch" in the training of models according to the first-vocabulary set 114.

Examples of training of the models to tag according to the first-vocabulary set 114 by leveraging models trained according to the second-vocabulary set 124 is described in the following in relation to FIGS. 2-5. Examples of use of the trained models to tag digital assets according to the first-vocabulary set 114 by leveraging the second-vocabulary set 124 is described in the following in relation to FIGS. 6-7. A section then follows in which a mathematical implementation example is described.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Model Training

Figure 2:
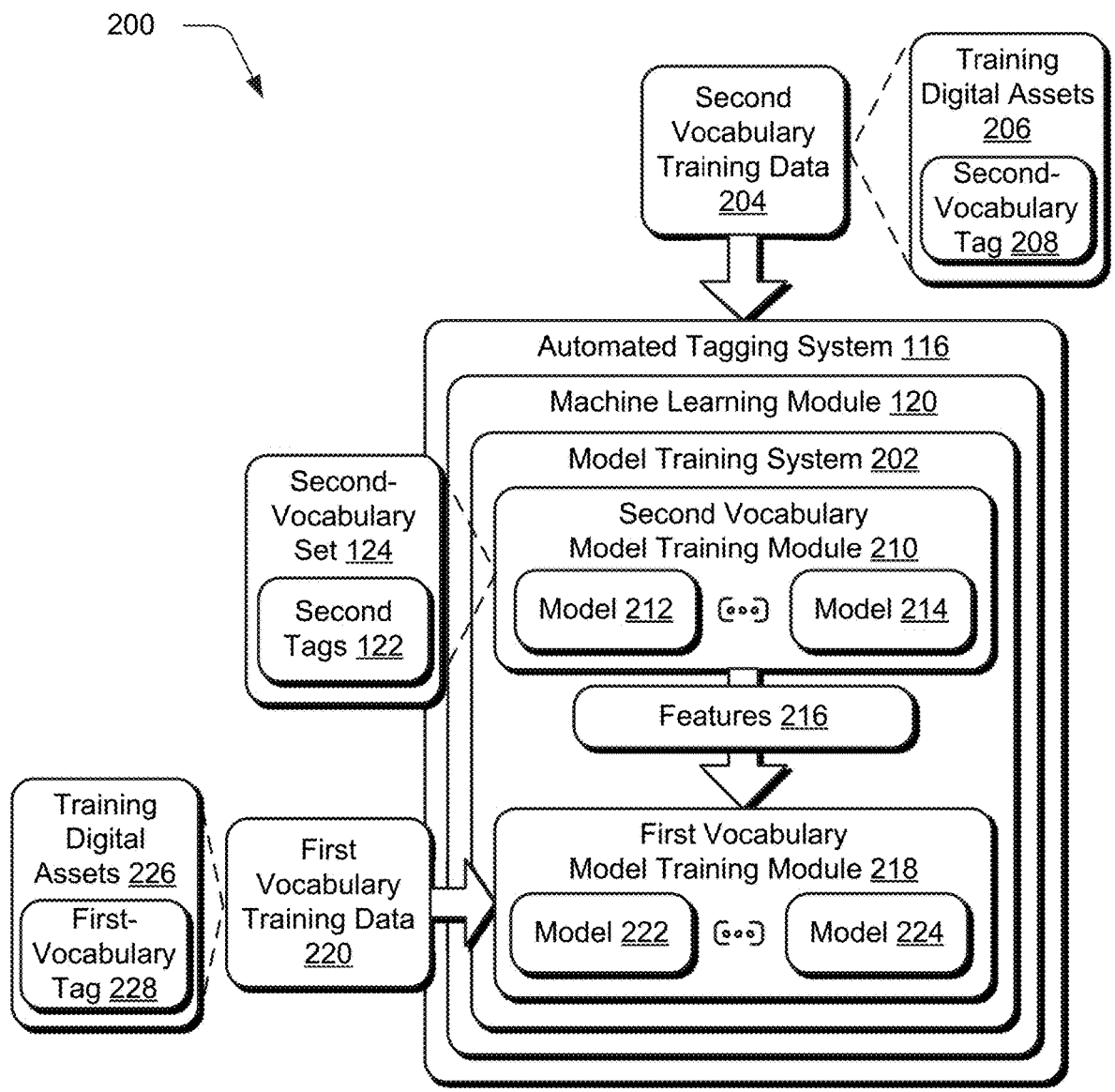
FIG. 2 depicts a system in which a model trained using a second-vocabulary set is leveraged to train a model for use in conjunction with a first-vocabulary set.
Figure 3:
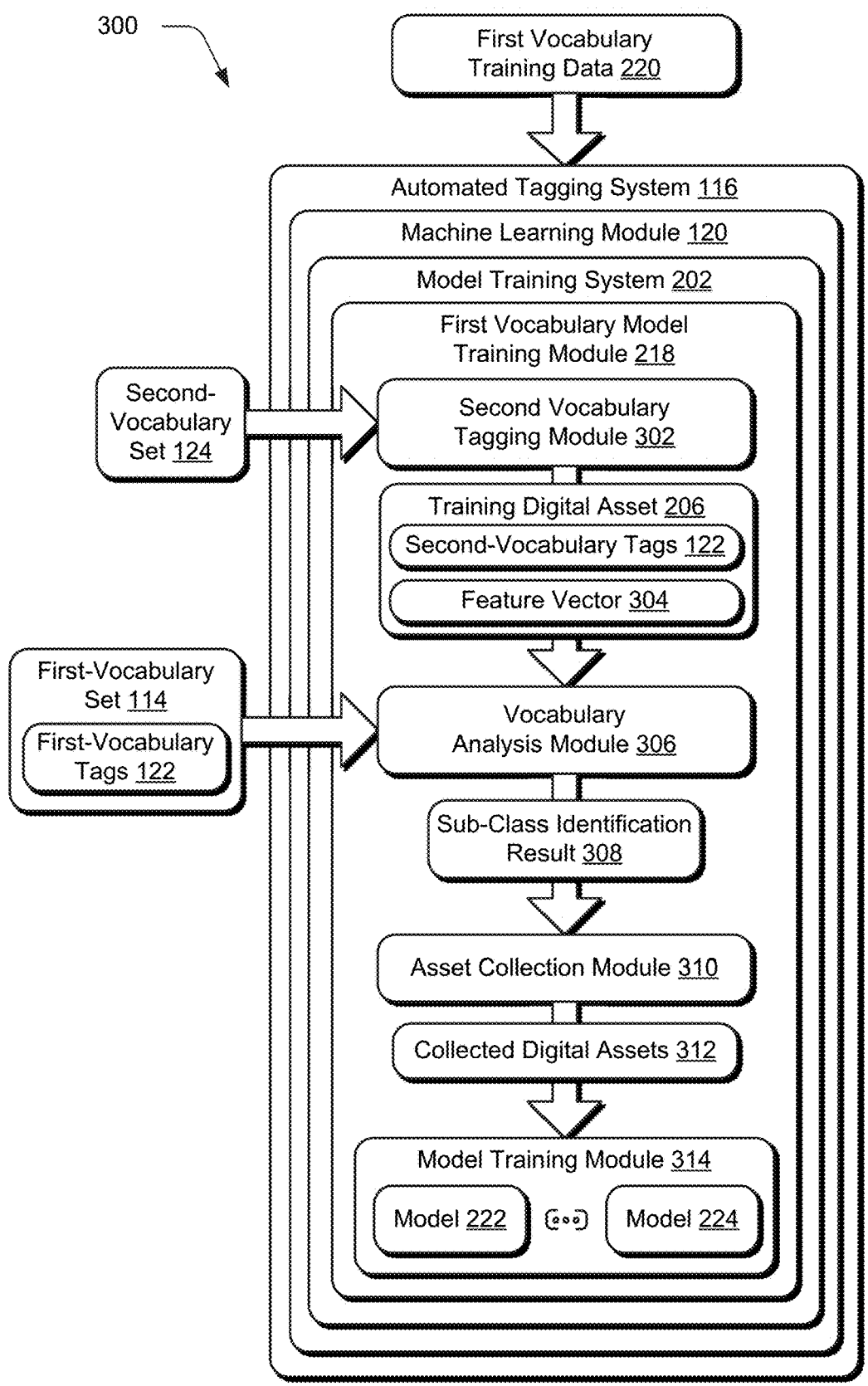
FIG. 3 depicts a system in an example implementation in which training of the model for use in conjunction with the first-vocabulary set is shown in greater detail.
Figure 4:
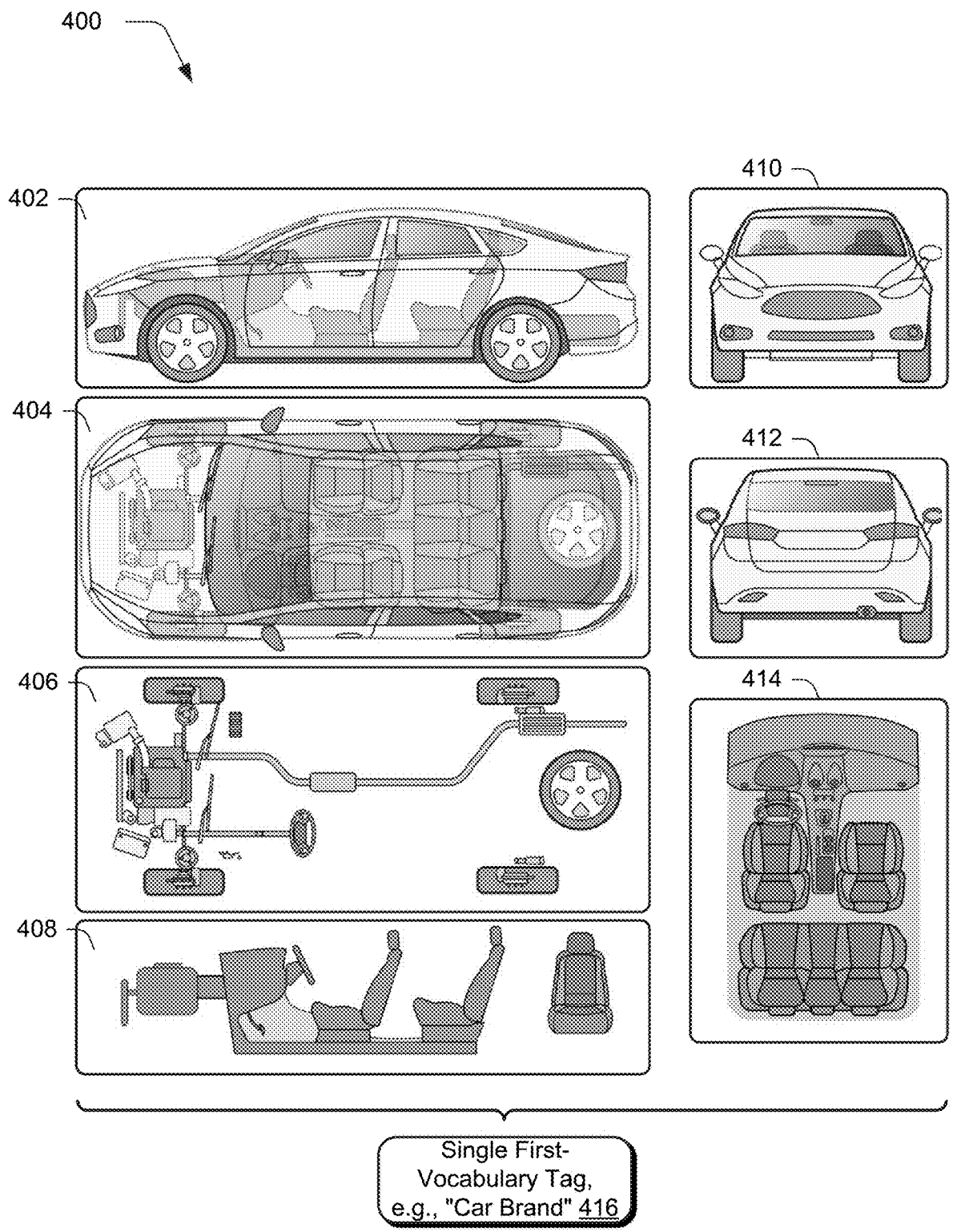
FIG. 4 depicts an example implementation in which several different digital assets are tagged using the same first-vocabulary tag from a first-vocabulary set of FIG. 1 for digital images in different visual classes.
Figure 5:
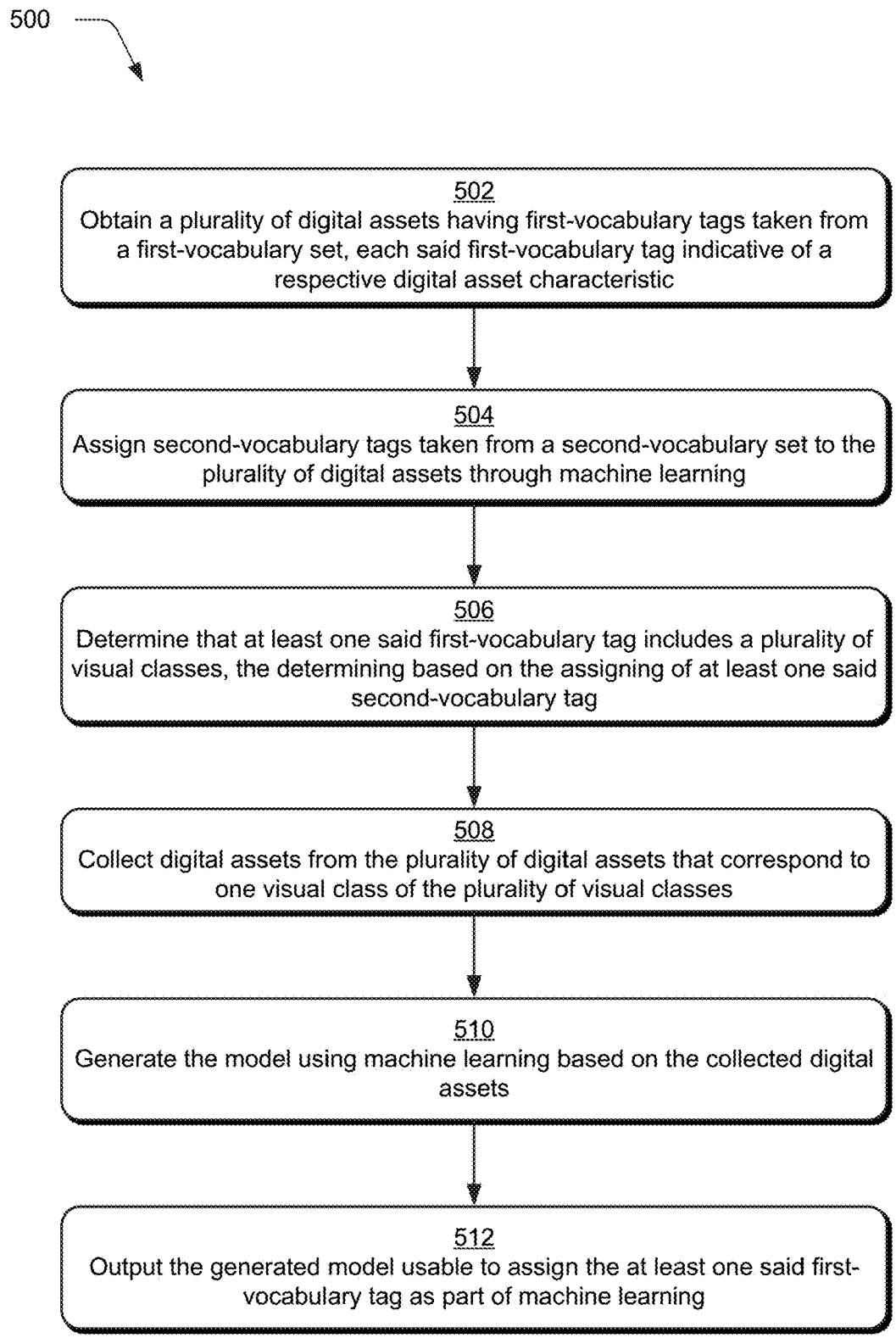
FIG. 5 is a flow diagram depicting a procedure in an example implementation in which a model is trained for use in tagging a digital asset according to a first-vocabulary set by leveraging a model trained according to a second-vocabulary set that has a different taxonomy than the first-vocabulary set.

FIG. 2 depicts a system 200 in which a model trained using a second-vocabulary set is leveraged to train a model for use in conjunction with a first-vocabulary set. FIG. 3 depicts a system 300 in an example implementation in which training of the model for use in conjunction with the first-vocabulary set is shown in greater detail. FIG. 4 depicts an example implementation in which several different digital assets are tagged using the same first-vocabulary tag 112 from a first-vocabulary set 114 for digital images in different visual classes. FIG. 5 depicts a procedure 500 in which a model is trained for use in tagging a digital asset according to a first-vocabulary set by leveraging a model trained according to a second-vocabulary set that has a different taxonomy than the first-vocabulary set.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeably to FIGS. 1-5.

As illustrated in FIG. 2, the machine learning module 120 includes a model training system 202 that is configured to generate models (e.g., as part of a neural network) based on tagged digital assets. Once trained, the models are usable to determine a probability that a corresponding digital asset includes a characteristic associated with a tag, which may then be used to tag the digital asset, e.g., if the probability is above a threshold.

To begin, the model training system 202 receives second vocabulary training data 204 including training digital assets 206 having associated second-vocabulary tags in accordance with the second-vocabulary set 124. The training digital assets 206, for instance, may be manually tagged through user interaction with a user interface of a computing device, automatically from another asset tagging system, obtained from a stock digital asset storage management system, and so forth.

The second vocabulary training data 204 is then employed by a second vocabulary model training module 210 to train models 212, 214 for each of the second-vocabulary tags 122 of the second-vocabulary set 124, i.e., the generic tags of the generic-vocabulary set. The second vocabulary model training module 210, for instance, may train the models 212, 214 as a base neural network according to the second-vocabulary tags 122 of the second-vocabulary set 124 by one or more computing devices. In an implementation, each of the models 212, 214 is trained for a respective digital asset characteristic of a respective single one of the second-vocabulary tags 122 of the second-vocabulary set 124. Examples of characteristics include objects, types of objects, sounds, semantic classes, visual characteristics, audio characteristics, and so forth.

Activations from nodes of the neural network of the models 212, 214 trained in accordance with the second-vocabulary set 124 are then extracted as features 216 (e.g., as a 1024-dimensional feature vector) for use by a first vocabulary model training module 218, e.g., for the custom-vocabulary set. The features 216 are then employed by a first vocabulary model training module 218 along with first vocabulary training data 220 having training digital assets 226 and associated first-vocabulary tags 228 (e.g., as metadata) to train models 222, 224 for each of the first-vocabulary tags 228 in the first-vocabulary set 114. In this way, the models 212, 214 trained in accordance with the second-vocabulary set 124 may be leveraged to generate models 222, 224 trained in accordance with the first-vocabulary set 114 in a computationally efficient manner, e.g., without "starting from scratch" as in conventional techniques.

FIG. 3 depicts an example system 300 showing operation of the model training system 202 of FIG. 2 in greater detail. To begin, first vocabulary training data 220 is obtained by the model training system 202. The first vocabulary training data includes several different digital assets that have first-vocabulary tags taken from a first-vocabulary set. Each first-vocabulary tag is indicative of a respective digital asset characteristic (block 502). The model training system 202, for instance, may obtain the first vocabulary training data 220 from the digital asset management system 104 as examples of digital assets 108 that have first-vocabulary tags 112 that are tagged in accordance with the first-vocabulary set 114.

Second-vocabulary tags 122 taken from a second-vocabulary set 124 are assigned to several different digital assets through machine learning (block 504). A second vocabulary tagging module 302, for instance, may utilize models 212, 214 trained as described in relation to FIG. 2 to assign second-vocabulary tags 122 to training digital assets 206 included in the first vocabulary training data 220. The second-vocabulary tags, for instance, may be stored as part of metadata associated with respective digital assets. As a result, each of the training digital assets 206 is assigned tags in accordance with the first-vocabulary set 114 (e.g., a custom vocabulary) as received from the digital asset management system 104 and a second-vocabulary set 124. These training digital assets 206 are then provided by the second vocabulary tagging module 302 to a vocabulary analysis module 306.

A determination is then made by the vocabulary analysis module 306 that at least one said first-vocabulary tag includes several different visual classes. The determination is based on the assignment of at least one of the second-vocabulary tags (block 506). Continuing with the previous car-manufacturer example, suppose the digital asset management system 104 manages digital assets 108 as digital images that have first-vocabulary tags 112 in accordance with a first-vocabulary set 114. One of these first-vocabulary tags 112 may correspond to a particular brand of car.

As shown in the example implementation 400 of FIG. 4, for instance, several different digital images 402, 404, 406, 408, 410, 412, 414 are tagged by a single first-vocabulary tag "car brand" 416. However, the digital images 402-414 may correspond to different visual classes. Digital images 402, 404, 410, 412, for instance, correspond to an exterior of a car, digital images 408, 414 show an interior of the car, and digital images 404, 406 show schematics of the car. Accordingly, a model trained to address each of these different visual classes may have reduced accuracy and introduce search errors.

Accordingly, in this example the vocabulary analysis module 306 determines that a single first-vocabulary tag 416 corresponds to multiple visual classes. This may be performed by comparing the first-vocabulary tag 416 with second-vocabulary tags 122 generated by the second vocabulary tagging module 302. The second-vocabulary tags 122, for instance, may identify different visual classes (e.g., car exterior, car seats, and so on) and thus the assignment of multiple second-vocabulary tags 122 for different visual classes to the single first-vocabulary tag 416 may be leveraged by the vocabulary analysis module 306 to identify the existence of these different visual classes.

In such a scenario, an asset collection module 310 is employed to collect digital assets from several different digital assets that correspond to one visual class of several different visual classes (block 508), e.g., collected digital assets 312. The asset collection module 310, for instance, may collect digital images 402, 404, 410, 412 that correspond to an exterior of a car. The collected digital assets 312 are then used by a model training module 314 to train a model 222 for that visual class of the single first-vocabulary tag 416 (block 510). This process continues for other visual classes of the single first-vocabulary tag 416, e.g., to collect digital images 408, 414 for an interior of the car and then train a model 224 for the interior of the car. Thus, in this example of the models 222, 224 may be considered sub-models of an overall model usable to assign a tag to a digital asset, e.g., per-tag linear SVM binary classifier models. The generated model is output as usable to assign the at least one said first-vocabulary tag as part of machine learning (block 512).

This process may be performed for positive models in which the models 222, 224 are trained to indicate a probability (e.g., confidence level) that the digital asset has a corresponding characteristic or negative models in which the models 222, 224 are trained to indicate a probability that the digital asset does not have a corresponding characteristic. Thus, both positive and negative models for a single first-vocabulary tag 416 may be considered sub-models of a model used to assign the single first-vocabulary tag 416 to a digital asset. This may be used to increase accuracy and include an ability to leverage sets of first vocabulary training data 220 that have fewer examples over conventional techniques. The asset collection module 310 may collect negative examples in a variety of ways, such as to collect digital images from a different visual class corresponding to the single first-vocabulary tag 416 (e.g., interior or exterior), use of different tags, and include randomly chosen digital assets that are not associated with the single first-vocabulary tag 416.

In an implementation example, the asset collection module 310 collects positive and negative examples for each of the first-vocabulary tags 228 that is to be a subject of a respective model 222, 224. A digital asset is considered a positive for a first (custom) tag if tagged with the first-vocabulary tag in the first vocabulary training data 220. The visual sub-class is also taken into account by the asset collection module 310 when assigning an example.

A digital asset is considered a "negative" by the asset collection module 310 for a first (custom) tag if not tagged with it. When assigning an asset as a negative example, the asset collection module 310 determines if it is a hard-negative for a given sub-class (e.g., if it belongs to the same visual class, but not tagged with that particular custom tag). For example, a digital asset of an interior of a different brand of car be a hard-negative for the interior of the sub-class of the particular brand in question. If a digital asset is determined as a hard-negative by the asset collection module 310, it is added with a high probability to the list of negatives for the sub-class, otherwise it is randomly chosen with a low probability. This is done to limit the size of the list of negatives. Another factor that is used by the asset collection module 310 to determine the candidacy of a digital asset as an (+/−) example is the number of visual sub-classes, to which, it belongs. Intuitively, the greater the number of visual classes that the digital asset belongs to, the worse it is as a positive/negative example. A digital image belonging to too many visual classes is not chosen as an example by the asset collection module 310, while for the rest, a penalty factor is computed by the asset collection module 310 which is averaged. Having described an example of training of the models 222, 224, an example is described in the following of use of the models 222, 224 to assign tags to digital assets in accordance with the first-vocabulary set 114.

Model Use

Figure 6:
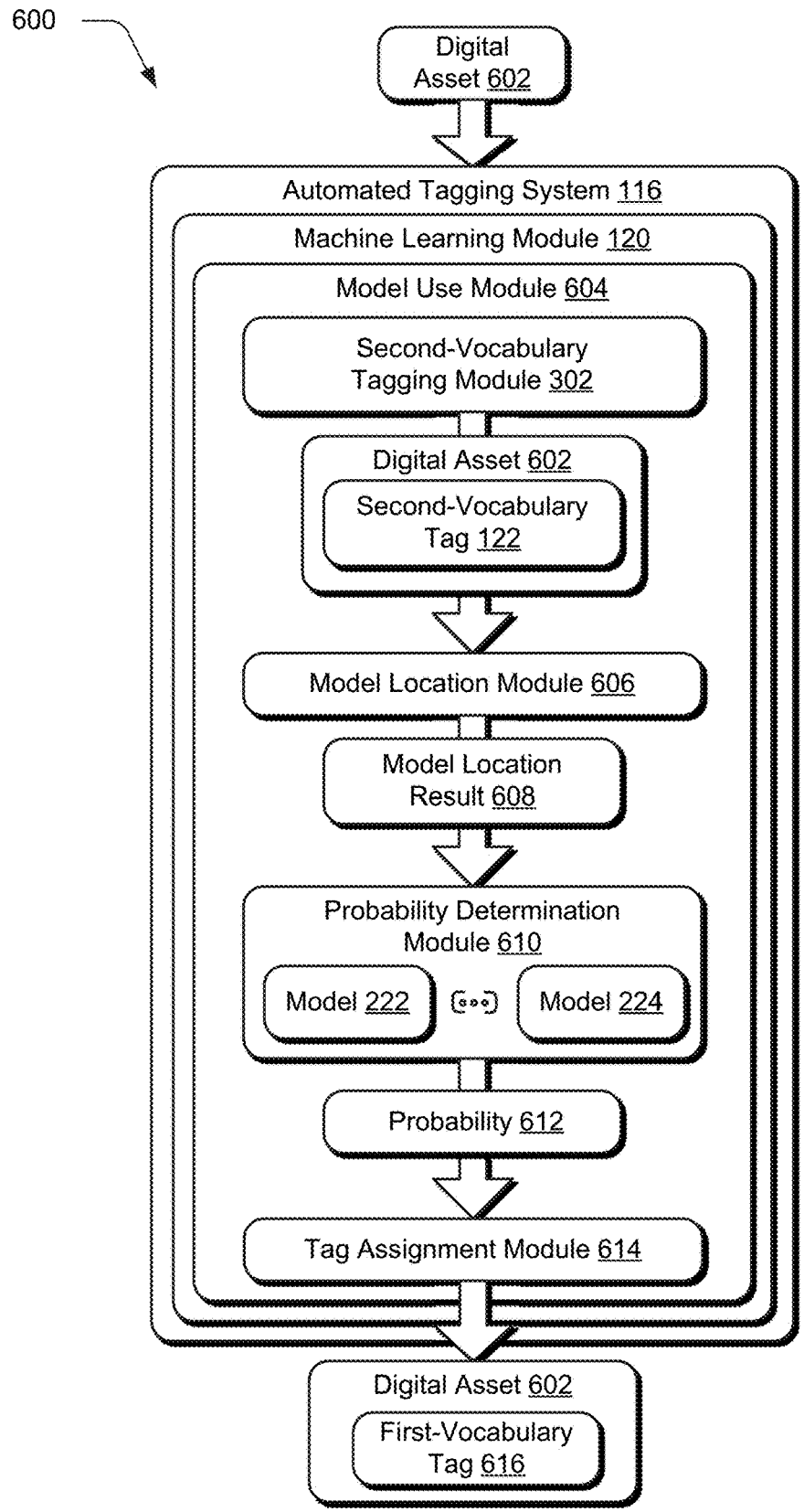
FIG. 6 depicts a system in which a model trained for use in conjunction with a first-vocabulary set as described in relation to FIG. 3 is used to tag a digital asset.
Figure 7:
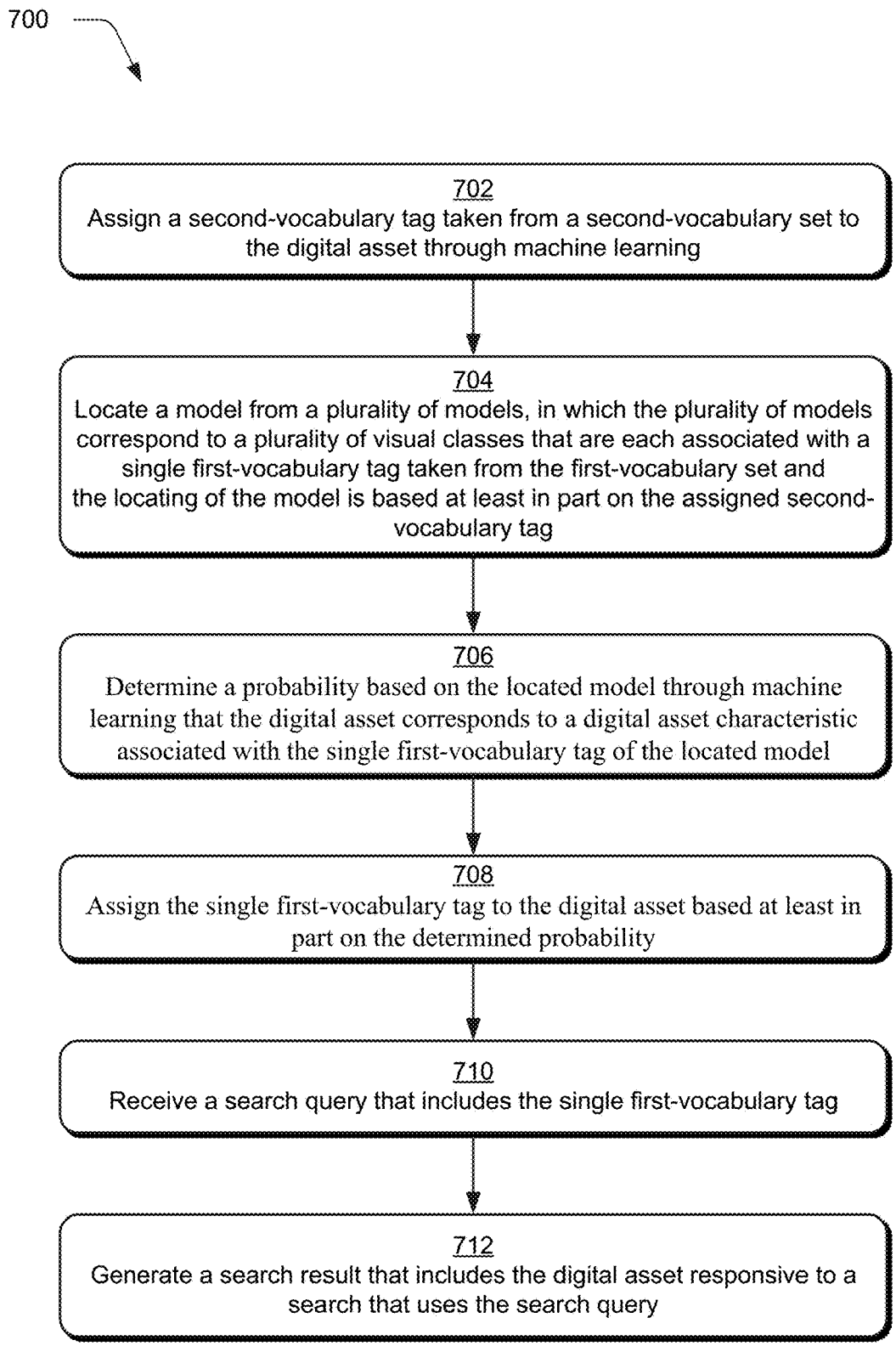
FIG. 7 is a flow diagram depicting a procedure in an example implementation in which a model is used to tag a digital asset.

FIG. 6 depicts a system 600 in which a model trained for use in conjunction with a first-vocabulary set as described in relation to FIG. 3 is used to tag a digital asset. FIG. 7 depicts a procedure 700 in which a model is used to tag a digital asset in accordance with a first-vocabulary set, e.g., a custom vocabulary. The following discussion describes techniques that may be implemented utilizing the previously described systems and devices. Aspects of each of the procedures may be implemented in hardware, firmware, software, or a combination thereof The procedures are shown as a set of blocks that specify operations performed by one or more devices and are not necessarily limited to the orders shown for performing the operations by the respective blocks. In portions of the following discussion, reference will be made interchangeably to FIGS. 6-7.

To begin, a digital asset 602 is received by the automated tagging system 116 for tagging, e.g., from the digital asset management system 104 via the network 130. A machine learning module 120 is then employed to assign a tag by the service provider system through use of a model use module 604.

To do so, a second-vocabulary tag 122 taken from a second-vocabulary set 124 (e.g., generic vocabulary) is assigned to the digital asset 602 through machine learning (block 702) by a second-vocabulary tagging module 302. The second-vocabulary tagging module 302, for instance, includes several different models 212, 214, each configured to assign a respective one of several different second-vocabulary tags 122 of the second-vocabulary set 124 through machine learning, e.g., as SVM models. As a result, the digital asset 602 is thus assigned with respective second-vocabulary tag 122 based on a probability (e.g., a confidence value) generated by a respective one of the models 212, 214, e.g., over a threshold value.

A model is located from several different models 222, 224 based at least in part on the assigned second-vocabulary tag 122. The several different models 222, 224 correspond to several different visual classes that are each associated with a single first-vocabulary tag taken from a first-vocabulary set (block 704). Continuing with the example of FIGS. 2-5, a single first-vocabulary tag 416 may correspond to several different visual classes, e.g., a particular brand of car as a custom tag. Accordingly, the second-vocabulary tag 122 (e.g., a generic tag) is used by a model location module 606 to generate a model location result 608. The model location result 608 indicates which of the several different models 222, 224 trained in accordance with the first-vocabulary set 114 correspond to the digital asset 602 based on the second-vocabulary tag 122. This may include models 222, 224 trained in accordance with a particular sub-class and respective visual class for a single first-vocabulary tag 416, positive and negative sub-models, and so forth.

The model location result 608 is then provided to a probability determination module 610. The probability determination module 610 is configured to determine a probability 612 (e.g., a confidence level) based on the located model through machine learning that the digital assets corresponds to a digital asset characteristic associated with the single first-vocabulary tag of the located model (block 706). The models 222, 224, for instance, may be configured to generate a probability 612 that indicates a confidence level that the digital asset 602 exhibits a corresponding characteristic, e.g., object, semantic class, positive or negative result, and so forth. The single first-vocabulary tag 416 is then assigned to the digital asset 602 based at least in part on the determined probability 612 (block 708) by the tag assignment module 614. This may include use of a threshold to define a minimum amount of confidence to be exhibited for assignment of a tag, use of positive and negative models and associated probabilities 612 as an aggregate result, and so forth.

The first vocabulary tag 616, once assigned, may be leveraged to support a variety of functionality. In one example, a search query is received that includes the single first-vocabulary tag (block 710), e.g., as part of a keyword search. A search result is generated that includes the digital asset responsive to a search that uses the search query (block 712), e.g., a keyword matches the first-vocabulary tag 616. In this way, the automated tagging system 116 may support tagging using multiple vocabulary sets with increased efficiency and accuracy over conventional techniques. An implementation example and mathematical description are included in the following section.

Implementation Example

The following discussion provides an example, described mathematically, of the functionality and features described above usable to support automated digital asset tagging using multiple vocabulary sets. In order to prepare the digital assets for training as the second vocabulary training data 204, the automated tagging system 116, performs the following operations in which the input is the training digital assets 206.

1: For each asset "a" in the repository:
2: Compute the set of generic tags "G(a)" using a base neural network model;
3: Compute a feature vector "f(a);" and
4: Retrieve a hash bucket for each tag "g" in G(a), which is referred to as "B(g)" for each "g" in "G(a)."

Regarding the bucket IDs in the above, tag generation for a digital asset is performed through use of a hashing scheme over the feature vectors, with multiple hash buckets typically selected in practice. A single hash bucket may yield several related tags, e.g., {car, vehicle, automobile} will typically belong to the same bucket. Thus, the bucket ID may be used to relate tags with each other.

As part of the analysis performed by the vocabulary analysis module 306, a list is obtained of digital assets tagged in accordance with the first-vocabulary set, e.g., the custom vocabulary, along with a list of second-vocabulary and first vocabulary tags. Frequency of tag occurrence is bounded by ($f_{min}$, $f_{max}$) for tag relevance. In order to determine whether sub-models are to be trained for a particular model, the following analysis is performed.

1: Classifiers={}
2: for each custom tag "c" in the list of custom tags "C":
3: Sample a set "S(c)" of assets that have been tagged with "c." Limit the size of "S(c)" for performance.
4: "G(c)={}", "Count(g)={}"
5: for each asset "a" in "S(c):"
6: "G(c)=union(G(c),G(a))" # add the set of generic tags to "G(c)"
7: for each generic tag "g" in "G(a):" # keep counts of the generic tags
8: "Count(g)=Count(g)+1"
9: Filter the set "G(c):"
  9.1 toRemove={}
  9.2 for each tag "g" in "G(c):"
    9.2.1: If there exist a tag "g'" in "G(c)" such that "B(g)=B(g')" (i.e., have the same bucket IDs) and "Count(g')>Count(g)" then "toRemove=toRemove U{g}"
    Another technique involves determining co-occurrences of tags along with buckets. Intuitively, high co-occurrence of specific tags suggests membership in the same class (and hence deemed duplicates).
    9.2.2 If "Count(g)<$f_{min}$" then "toRemove=toRemove U {g}"
    9.2.3 If "Count(g)>$f_{max}$" then "toRemove=toRemove U {g}"
    9.2.4 Compute the count of assets in "S(c)" not tagged with the custom tag "c," but are tagged with the generic tag "g." If this count is smaller than a threshold, then "toRemove=toRemove U{g}"
  9.3 "G(c)=G(c)–toRemove"
10: If "G(c)={}" then add the most frequent tag to "G(c)" # G(c) is then the set of sub-classes for the tag "c."
11: for each tag "g" in "G(c):"
12: "Classifiers=Classifiers U {(c, g)}" # add the pair (custom tag, generic tag) as a tag model.

The asset collection module 310 is then used to collect digital assets with associated features "(f)," as follows, e.g., with positive and negative examples:

1: for each asset "a" in the repository
compute asset penalty (corruption)
2: buckets={}
3: for each generic tag "g" associated with the asset "a:"
4: "buckets=buckets U {B(g)}"
5: "x=|buckets|"
6: if "x>$x_{max}$" move to the next asset (go to 1)
7: "p(a)=$\rho_{max}(2^{x-1/x_{max}^2}-1)$" where "$x_{max}$" is the maximum penalty allowed for an asset to be admitted as a valid example (e.g., a default value of 6), and "$\rho_{max}$" is the maximum penalty (e.g., 0.5)
add as a positive example
8: for each custom tag "c" associated with "a:"
9: for each generic tag "g" associated with "a:"
10: if (c, g) is a valid classifier model (as determined by the previous algorithm) then add "(f(a), p(a))" as a positive example for "(c,g)", e.g., "Positives(c, g)=Positives(c, g) U {(f, p}"
add as a negative example
This sampling process results in about 10%-30% random negatives and the rest as hard negative assets 11: for each tag model "(c, g)" in Classifiers:
12: [HARD NEGATIVE] if "a" is tagged with generic tag "g" but is not tagged with custom tag "c," then it is a hard negative and it is added to "Negative(c, g)" with a high probability.
  [RANDOM NEGATIVE] if "a" is not tagged with either "c," or "g," then it is added to "Negative(c, g)" with a small probability.

The model training module 314 is then employed to train models 222, 224 based on the collected digital assets 312 from above, e.g., as trained binary SVM classifiers and aggregate penalties.

1: for each tag model "(c, g)" in Classifiers:
2: "m (c, g)=Train-SVM(Positives(c, g).f, Negatives(c, g).f)"
3: "p(c, g)=0.5*(Average(Positives(c, g).p),+Average(Negatives(c,g).p)"

A model use module 604 is then employed to generate a probability 612 and assign tags based on that probability through use of the models 222, 224 trained above as follows:

1: Compute feature vector "f" and the set of generic tags "g" using the base neural network model.
2: CT={}
3: for each classifier tag model "(c, g)" in Classifiers:
4: if "q" is tagged with generic tag "g" then:
5: "confidence=SVM-predict(m(c,g), f)"
6: "confidence=confidence–P(c,g)" # subtract the penalty for spurious examples
7: if "confidence>=threshold-confidence" then "CT=CT U {(c, confidence)}"
8: Filter CT removing duplicates (choosing the lower confidence each time).

Mathematical Description

The following list includes example definitions used in the discussion.

A={Set of ALL Assets in the DAM}
G={Set of ALL Generic Tags}
C={Set of ALL Custom Tags for the repository}
M={Set of All Manually Tagged Assets in the DAM}⊆A
C(m)={Set of Custom Tags applied to asset m∈M}⊆C
G(m)={Set of Generic Tags applied to asset m∈M}⊆G
U={Set of All Untagged Assets with NO tags–custom or generic}⊆A
N(a)=N: A→A×$\mathbb{R}^{1024}$×{(g,p)|g∈G(a), p∈[0,1]}$^k$ is the base neural network model which is a relation from an asset "a" to multiple tags in "G" and corresponding confidence values.

For each asset "a," "N(a)=(a, f(a), {(g1, p1), (g2, p2), . . . })" where "f(a)∈$\mathbb{R}^{1024}$" and "(g, p)" are ordered-pairs representing tags from from "G" and the corresponding confidences. Note that the generic tag "$g_i$" itself is associated with a bucket ID "b" which may be shared between multiple tags attached to the same asset. A bucket is a collection of similar generic tags, e.g., {auto, automobile, vehicle, car, . . . } as follows:

$B(g_i):G \to \mathbb{Z}+$ so that $g_i$ belongs to the bucket $B(g_i)$

In order to train the model, the following operations are performed.

1. Asset Preparation
Construct "$s_m$={$s_m$|$s_m$=N(m)" for each "m∈M}."
"$s_m$=(f(m), $G_m$)"
"f(m)" is a 1024 dimensional feature vector of real numbers ρ"$G_m$" is the set of predicted tags for the asset "m".
Each element of "$G_m$," is an ordered pair (tag, confidence score).

2. Analyze Tag Multiplicity (e.g., for each custom tag "c" in "C")
   Sample a set "$S_c$" from "$s_m$" for each custom tag "c" from "C"
   "$S_c \subseteq S_m$|" for each "$s_c \in S_c$," "$c \in C(s_c)$" (i.e., the tag "c" is present in "$S_c$")
   Also, "$|s_c| \leq 50000$" (arbitrary limit)
   Compute a super-set "$G_c$" of generic tags in assets tagged with the custom tag "c."
   "$G_c = \{g | g \in G(m)$" and "$c \in C(m)$" and "$m \in S_c\}$"
   Compute the histogram of generic tags in "$G_c$" for assets in "$S_c$."
   "$H_c = \{(g, h) | g \in G, h = |S_{cg}|$" where "$S_{cg} \subseteq S_c$" such that "$g \in G(s_{cg})$" for every "$s_{cg} \in S_{cg}\}$"
   "$H_c(g)$" gives the number of examples of assets in "$S_c$," that have the generic tag "$g \in G$."
      i.e., "$H_c(g)$" is the frequency of the generic tag "g" in the assets with the custom tag "c."
   Filter the set "$G_c$" to remove duplicates (by virtue of belonging to the same generic tag bucket).
   "$G_{cf} = \{g_i | \text{if } B(g_i) = B(g_j)$" where "$g_i, g_j \in G_c$," then "$H(g_i) \geq H(g_j)\}$", e.g., keep only the most frequent tag from each bucket.
   In another example, filter "Gcf" to remove low-frequency tags from strongly co-occurring tag pairs.
   Define "$O(g_i, g_j) = |S_i \cap s_j|/|S_i|.||S_j|$" where "$S_i$, $S_j \subseteq S_m$" such that "$g_i \in G(m)$" for each "m" in "$S_i$"
   "$G_{cf}' = \{g_k | O(g_k, g_l) >= k_o$" where "$g_k, g_l \in G_{cf}\}$"
   Then "$G_{cf} = G_{cf} - G_{cf}'$"
   Compute for each tag "c" in "C," the set "$G_{ac}$" of applicable sub-classes (of generic tags) as:
   "$G_{ac} \subseteq G_{cf}$|" for each "$g_{ac}$" in "$G_{ac}$:"
      "$f_{min} \leq (H_c(g_{ac})/(g_{ac})/\Sigma H_c) \leq f_{max}$", i.e., the normalized frequency of the generic tag "$g_{ac}$" is in the interval "$[f_{min}, f_{max}]$"
      "$|Neg(g_{ac})| \geq k_{min-train}$" where "$Neg(g_{ac}) = \{m_{ac} | cC (m_{ac})$ and $g_{ac} \in G(m_{ac})\}$" and "$k_{min-train}$" is a constant, i.e., the set of assets that are not tagged with the custom tag "c," but are tagged with the generic tag "$g_{ac}$."
   "$G_{ac}$" is the set of significant sub-classes applicable for the tag "c"
   If "$G_{ac} = \emptyset$" then "$G_{ac} = \{g_m | $" for each "$g_j$ in $G_{cf}$," "$H(g_m) \geq H(g_j)$," i.e., if after the above computation, "$G_{ac}$" is still empty, the most frequent generic tag is added to "$G_{ac}$."
   At the end of this computation, the set of significant sub-classes (defined by generic tags) "$G_{ac}$" is obtained for every custom tag "c" in "C."
   Then, the set of tag models "$T = \{(c, g) | c \in C \text{ and } g \in G_{ac}\}$" is defined over all "c" in "C." These tag models are associated with individual linear binary SVM models and are trained separately.
3. Collect examples for each tag model "(c, g)" in "T"
   "$E_{c,g}+ = \{(f(m), p(m)) | m \in M, g \in G(m) \text{ and } c \in C(m)\}$" the set of positive examples for "(c, g)"
   Here "f(m)" is the feature vector for the asset "m"
   "$\rho(m)$" is a penalty associated with using the asset "m" as an example. The penalty is employed because sometimes digital assets (e.g., digital images) with multiple visual content classes (such as both a car, a flower, a man and a woman) are used to train a model for a single tag model and this may be detrimental to the tag's classification performance. The penalty offsets the confidence for any classification done with the model.
   "$\rho(m) = (2^{x-/x_{max}2} - 1)$" where:
      "$x = |B_m|$" for "$B_m = \{$unique $b | b = B(g)$" and "$g \in G(m)\}$" i.e., the size of the set of unique buckets to which the generic tags of "m" belong.

"$x_{max}$" is the maximum number of buckets allowed for an asset to be admitted as a valid example
"$\rho max$" is the maximum penalty (e.g., 0.3), this amounts to an exponentially increasing penalty with greater number of buckets, with the value ranging between [0, 0.3]
The set of negative examples "$E_{c,g}-$" is chosen using a sampling process.
   For each asset "m" evaluated as a positive example for some model "$(_c, g)$"
      "m" is considered a negative example for some model "(c', g')" if:
         "(Random Choice) gen-random( ) > $P_{rand}$" (e.g., 0.1-0.3)
         "(Hard-Negative Choice) c' C(m) but g' $\in$ G(m)", i.e., "m" is not tagged with custom tag "c," but is tagged with generic tag "g'".
   This sampling process results in approximately 10%-30% random negatives and the rest as hard negative assets (that are in the same generic tag-class "g" but do not have the corresponding custom tag "c'"). As an example of a hard-negative for a tag model for a particular brand, car will be an asset tagged with the generic tag "car" but not with the custom tag of the brand.
4. Next, binary SVM classifiers are trained for each tag model "(c, g)" using the corresponding examples "($E_{c,g}+$, $E_{c,g}-$)"
   The corresponding tag model is defined as a function "$t_{c,g}: \mathbb{R}^{1024} \to [0,1]$"
      That maps for an asset "m," the feature vector "f(m)" to a tag-probability for the custom tag "c."
      The average penalty for the model "($\rho avg$)" is also computed.
In order to use the model, the following operations are performed.
5. Asset Preparation, the asset "$m \in U$" to be tagged is first tagged with generic tags using the base neural network model.
   Compute "$s_m = (f(m), G_m) = N(s_m)$." Then "$G(m) = G_m$"
6. Tag Model Selection
   "$T_m \subseteq T$," such that "$T_m = \{t_{c,g}$ where $g \in G(m)\}$"
   "$T_m$" represents the set of tag-models applicable to the asset "m."
7. Tag Prediction
   Compute the set "$I_m$" of (tag, confidence) pairs for the asset "m"
   "$I_m = \{(i_{c,g}, P(i_{c,g})) | t_{c,g} (f(m)) \geq (P_{min} + 0.5 * P_{avg})\}$"
   "$P_{min}$" is the minimum confidence for tag inference. This value is empirically decided based on the Precision-Recall analysis of a dataset. The default is approximately 0.7.
   "$P_{avg}$" is the average penalty for the model's training-examples. The maximum value this value takes is 0.125 in an example.
   The set of reported custom tags are then "$\{(\text{unique } c, P(c)) | (c, P(c)) \in I_m\}$"
   If more than one tag-model produces the same custom tag "c" for an asset, the one with the lower confidence is chosen.
   This choice is a hyper-parameter biasing the system towards being conservative about inferring custom-tags. Other choices are therefore equally valid.

Example System and Device

Figure 8:
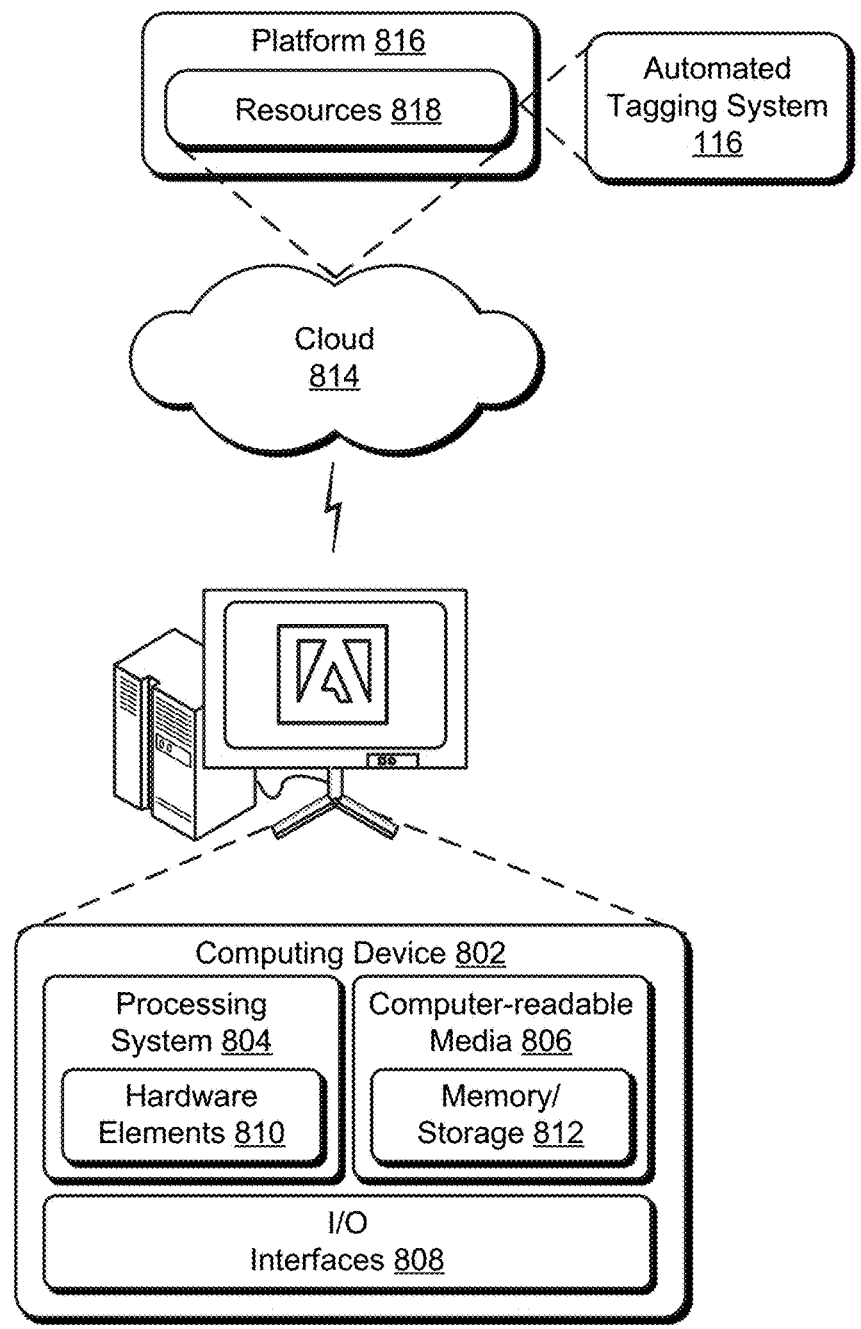
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the automated tagging system 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium model training environment, a method implemented by at least one computing device, the method comprising:
obtaining, by the at least one computing device, a plurality of digital assets having first-vocabulary tags taken from a first-vocabulary set, each said first-vocabulary tag indicative of a respective digital asset characteristic;
assigning, by the at least one computing device, second-vocabulary tags taken from a second-vocabulary set to the plurality of digital assets through machine learning by a first model;
determining, by the at least one computing device, that at least one said first-vocabulary tag includes a plurality of visual classes, the determining based on the assigning of at least one said second-vocabulary tag;
collecting, by the at least one computing device, digital assets from the plurality of digital assets that correspond to one visual class of the plurality of visual classes;
training, by the at least one computing device, a second model using machine learning to assign the at least one said first-vocabulary tag to a subsequent digital asset having the one visual class of the plurality of visual classes, the training based on the collected digital assets; and
outputting, by the at least one computing device, the trained model.

2. The method as described in claim 1, wherein the respective digital asset characteristic identifies an object or a semantic class.

3. The method as described in claim 1, wherein the model is a support vector machine binary classifier model.

4. The method as described in claim 1, wherein the collecting includes collecting positive and negative examples of the one visual class from the plurality of digital assets and the training of the model is based on the collected positive and negative examples.

5. The method as described in claim 4, wherein at least one collected negative example includes a digital asset, to which, the at least one said first-vocabulary tag is not assigned.

6. The method as described in claim 1, wherein the assigning of the second-vocabulary tags is performed using at least one model trained, by machine learning, using a plurality of training digital assets that are tagged using second-vocabulary tags taken from the second-vocabulary set.

7. The method as described in claim 1, wherein the plurality of digital assets are digital images.

8. The method as described in claim 1, wherein the first-vocabulary set includes first-vocabulary tags that are different than second-vocabulary tags of the second-vocabulary set.

9. The method as described in claim 1, wherein the first-vocabulary set and the second-vocabulary set have different respective taxonomies.

10. In a digital medium environment to use a model to tag a digital asset according to a first-vocabulary set, a system comprising:
a processing system; and
a computer-readable storage medium having instructions stored thereon that, responsive to execution by a computing device, causes the computing device to perform operations comprising:
assigning a second-vocabulary tag taken from a second-vocabulary set to the digital asset through machine learning;
locating a model from a plurality of models, in which:
the plurality of models correspond to a plurality of visual classes that are each associated with a single first-vocabulary tag taken from the first-vocabulary set, the plurality of models trained using machine learning; and
the locating of the model is based at least in part on the assigned second-vocabulary tag; and
determining a probability based on the located model through machine learning that the digital asset corresponds to a digital asset characteristic associated with the single first-vocabulary tag of the located model.

11. The system as described in claim 10, wherein the digital asset characteristic identifies an object or a semantic class.

12. The system as described in claim 10, wherein the model is a support vector machine binary classifier model.

13. The system as described in claim 10, further comprising assigning the single first-vocabulary tag to the digital asset based at least in part on the determined probability.

14. The system as described in claim 10, wherein the assigning the second-vocabulary tag based on at least one model trained, by machine learning, uses a plurality of training digital assets that are tagged in compliance with the second-vocabulary set.

15. The system as described in claim 10, wherein the plurality of digital assets are digital images.

16. The system as described in claim 10, wherein the first-vocabulary set includes first-vocabulary tags that are different than second-vocabulary tags of the second-vocabulary set.

17. The system as described in claim 10, wherein the first-vocabulary set and the second-vocabulary set have different respective taxonomies.

18. One or more computer-readable storage media having instructions stored thereon that, responsive to execution by a processing system, causes the processing system to perform operations comprising:

assigning second-vocabulary tags taken from a second-vocabulary set to a plurality of digital assets through machine learning by a first model, the plurality of digital assets having first-vocabulary tags taken from a first-vocabulary set, each said first-vocabulary tag indicative of a respective digital asset characteristic;

determining that at least one said first-vocabulary tag includes a plurality of visual classes, the determining based on the assigning of at least one said second-vocabulary tag;

collecting digital assets from the plurality of digital assets that correspond to one visual class of the plurality of visual classes; and training a second model using machine learning to assign the at least one said first-vocabulary tag to a subsequent digital image having the one visual class of the plurality of visual classes based on the collected digital assets.

19. The one or more computer-readable storage media as described in claim 18, wherein the plurality of digital assets are digital images.

20. The one or more computer-readable storage media as described in claim 18, wherein the first-vocabulary set and the second-vocabulary set have different respective taxonomies.

* * * * *